(12) United States Patent
Karinen

(10) Patent No.: US 12,532,874 B1
(45) Date of Patent: Jan. 27, 2026

(54) FISHING RIG

(71) Applicant: Timothy John Karinen, Grosse Ile, MI (US)

(72) Inventor: Timothy John Karinen, Grosse Ile, MI (US)

( * ) Notice: Subject to any disclaimer, the term of this patent is extended or adjusted under 35 U.S.C. 154(b) by 0 days.

(21) Appl. No.: 19/291,190

(22) Filed: Aug. 5, 2025

(51) Int. Cl.
| A01K 91/14 | (2006.01) |
| A01K 93/00 | (2006.01) |
| A01K 95/00 | (2006.01) |

(52) U.S. Cl.
CPC .............. *A01K 91/14* (2013.01); *A01K 93/00* (2013.01); *A01K 95/00* (2013.01)

(58) Field of Classification Search
CPC ...... A01K 91/04; A01K 91/047; A01K 91/14; A01K 93/00
See application file for complete search history.

(56) References Cited

U.S. PATENT DOCUMENTS

| 3,943,652 A | 3/1976 | Aunspaugh |
| 3,974,591 A | 8/1976 | Ray |
| 3,977,115 A | 8/1976 | Check |
| 4,321,766 A | 3/1982 | Henderson |
| 5,369,905 A | 12/1994 | DeMars |
| 5,960,579 A | 10/1999 | Hampton |
| 6,813,856 B1 | 11/2004 | Sitkewicz et al. |
| 7,415,792 B1 * | 8/2008 | Noble ............... A01K 93/00 43/44.87 |
| 7,437,850 B1 | 10/2008 | Seay et al. |
| 9,301,511 B1 | 4/2016 | Clarambeau |
| 2006/0026892 A1 | 2/2006 | Nakamichi |
| 2006/0156612 A1 | 7/2006 | Brzozowski |
| 2006/0283074 A1 | 12/2006 | Barrow et al. |
| 2008/0256841 A1 | 10/2008 | DeSpiegelaere |
| 2019/0230910 A1 | 8/2019 | Shikina et al. |

FOREIGN PATENT DOCUMENTS

| KR | 101277203 B1 * | 6/2013 | |
| KR | 20130004028 U * | 7/2013 | ............. A01K 91/04 |
| KR | 20150004648 U * | 12/2015 | ............. A01K 91/00 |
| KR | 20240134515 A * | 9/2024 | ............. A01K 91/04 |

* cited by examiner

*Primary Examiner* — Richard G Davis
(74) *Attorney, Agent, or Firm* — Dunlap Bennett & Ludwig PLLC (57) ABSTRACT

A fishing rig is provided that combines differing combinations of assemblies to form a multipurpose fishing rig capable of fishing differing environments, species and differing fishing methods. The assemblies of the fishing rig include a main leader assembly that utilizes an inline float with a radial bore to attach to a side leader assembly. The side leader assembly includes at least a spacer bead and a cinch bead utilized for adjustable tensioning when attached to the main leader. A hook or lure assembly is provided and attached to the side leader assembly for either live bait, or lure fishing.

13 Claims, 5 Drawing Sheets

FISHING RIG

BACKGROUND OF THE INVENTION

Field of Endeavor

The present invention relates to fishing rigs, and more particularly, to a terminal fishing rig with side leader attachment to a main leader through an inline float adjustable for both tension and height.

Background of Related Art

Fishing rigs are specific arrangements of fishing tackle used to present bait or lures to fish. These rigs typically include a combination of lines, hooks, weights, swivels, beads, floats and other components designed to attract and hook fish in different environments and for various species. The choice of rig depends on factors like the target species, water conditions, and fishing style.

Typically, rigs utilizing sinker and in line floats have many limitations in fishing harsh conditions such as current, weed beds, and rocks especially when fishing multiple species with varied fishing methods such as still fishing, drifting, drop shotting, jigging, jerking, or steady retrieve at a controlled depth. The rigs utilizing sinker and inline cylinder floats, include: Lindy, Carolina, Catfish, Pompano, Carp, Steelhead or Salmon River rigs. These rigs with either the cylinder float on the main line or side leader all have a free-floating cylinder float. Each of the above rigs has one or more of the following disadvantages: snagging in unfavorable rock, grass, and current conditions; little improvement in similar still fishing conditions; the float and leader often twist in current and the sinker will snag; incapable of being easily retrieved; and/or are limited to fishing off the bottom One of the major performance issues for attaching the side leader thru an inline float is float integrity. In snags or breakaway, the inline float often tears requiring replacement. Another issue in rigs with adjustable tension is that a slider knot attaching the leader and providing slip for adjustment requires a stop, as illustrated in U.S. Pat. No. 5,369,905. The method therein, that uses the side leader attached thru an inline float still has this requirement, but only for rig retention and is not so limited. Increasing the slip tension with tighter knots or the slip tension of the stop on the main leader often result in memory or even abrasion issues.

As can be seen, there is a need for a terminal fishing rig with side leader attachment to a main leader through an inline float adjustable for both tension and height that solves these performance issues.

SUMMARY OF THE INVENTION

In one embodiment, a fishing rig includes a main leader assembly with a main leader; an inline float affixed to the main leader and having a longitudinal bore and a radial bore that together form a loop around the main leader; a weight affixed to the main leader; and a single-line cinch bead positioned between the inline float and the weight. The rig also includes a side leader assembly comprising a side leader attached in the radial bore via a first knot at one end of the side leader; first bead, a double-line cinch bead adjacent to the first bead, a single line cinch bead, float, second bead spaced along the side leader; and the hook attached to the second end of the side leader via a second knot.

In another embodiment, a fishing rig includes a main leader assembly with a main leader passing through an inline float and terminating in a bead; a weight assembly comprising a leader, a weight, a bead and a first two-way swivel; a hook assembly comprising a hook leader, a hook, first, float and second beads, and a second two-way swivel; and a side leader assembly comprising a side leader secured to the loop in the radial bore, a spacer bead with multiple inner diameters, a double-line cinch bead, a spinner blade mounted via a clevis, and beads immediately upstream and downstream of the clevis. The main leader is connected to the first two-way swivel, and the side leader is connected to the second two-way swivel.

In other embodiments, the inline float is an inline cylinder float, the first knot is a reverse Palomar knot and the second knot is a five-wrap Snell knot. These and other features will be more fully understood from the detailed description and accompanying drawings.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Traditionally, fishing rigs do not attach a side leader through an inline cylinder float, which creates performance issues and disadvantages when fishing in differing environments, or when fishing for differing species. Specifically, traditional rigs designs have limitations related to the environmental conditions in which they are utilized, the type of fishing method utilized, the interplay of the components utilized, and/or the retrieval method.

Broadly, an embodiment of the present invention provides a fishing rig that combines a drop shot terminal sinker on the main leader with a side leader attached thru a specific combination of an inline cylinder float, spacer bead, and cinch bead with a method for both connecting the main and side leader with a reverse Palomar knot and the cinch bead with a double-line cinch knot that can then later be used for readjusting the lower slip tension.

Advantageously, attachment thru an inline cylinder float, as in the present invention, not only keeps the bait above hazards, but also contributes to less drag at the sinker highly advantageous in both drift and still fishing using bait runner reels. The attachment assembly of the present invention, i.e. a side leader through an inline cylinder float, or floats, on a main line also stabilizes the side leader significantly to allow varied addition of beads, cinch beads, floats, spinners, hooks, or lures. The rig of the present invention allows for varied combination of fishing methods, i.e. with either a tight or slack line, drifted, or retrieved as desired.

Additionally, the rig of the present invention allows for fishing of different species at varied depths as the rig of the present invention can be height adjusted. With embodiments that provide either one, dual tensions, or a locked tension that is reversible to a lower tension, the lower tension being re-adjustable, the rig of the present invention can also be utilized to target different species with varied hook set or retractable sinker tensions.

Additionally, the inline float attachment design with the reverse Palomar knot positioned within the inline cylinder float, or spacer bead contributing increased slip tension to that provided by the knot results in in the reduced main leader memory issues allowing the additional use of fluorocarbon leader in these rigs. Additionally, using an 8 mm spacer bead and a 4 mm single-line cinch bead in embodiments with or without swivels in the side leader or mainline provide a break point which allows rig recovery with both inline cylinder float, slip tension, and main line integrity following breakaway with only the loss of the sinker or hook.

Referring now to the Figures, FIGS. 1-7D illustrate various embodiments of the present invention. Broadly, the embodiments of the present invention include one or more common aspects such as a main line having a float affixed to a two-way swivel, the float having a side leader disposed through the float. In embodiments, differing components, and/or combinations, orientation, number, or type of components, are utilized in differing embodiments.

FIGS. 1-3B illustrate a first embodiment of a fishing rig, according to aspects of the present invention. A two-way swivel 30 is affixed to a first end of main leader 12 using a knot, or tie, such as a Palomar knot 32. In embodiments, the main leader has a diameter of 0.018 inches but is not so limited. A weight 10 is affixed to a second end of main leader 12 using a knot, or tie, such as a three-wrap cinch knot 36. In embodiments, weight 10 can be a drop sinker, but is not so limited. In embodiments, the drop sinker is a steel drop sinker. A float, such as inline cylinder float 18, is affixed between the first end and the second end of main leader 12, with a portion of main leader 12, forming a loop, protruding from a hole on a side of inline cylinder float 18. In embodiments, the hole is a radial bore which is normal to a longitudinal bore of the float. In embodiments, the hole has an inner diameter 56, which can be 0.078 inches, but is not so limited. A bead, such as single line cinch bead 50, is affixed on main leader 12 on a portion between weight 10 and inline cylinder float 18. Attachment with a knot, such as a single-line cinch knot 38 tied on main leader 12 allows cinch bead 50 to function as both a stop for the adjustable rig and to retain the rig with breakaway of the sinker.

Figures 1, 2:
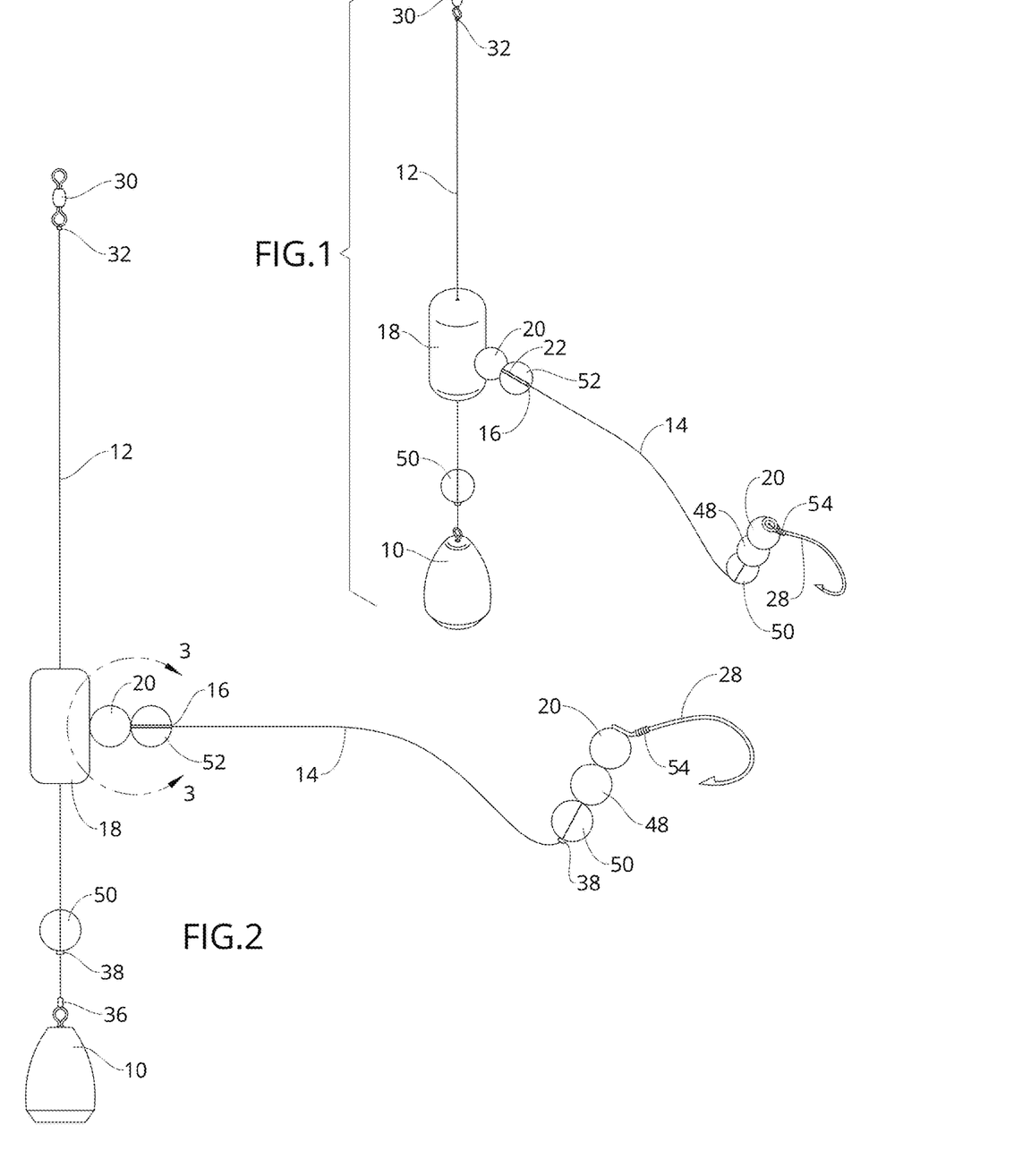
FIG. 1 is a perspective view of a schematic diagram of a first embodiment of a Fishing Rig, according to aspects of the present invention.
FIG. 2 is an elevation view of a schematic diagram of a first embodiment of a Fishing Rig, according to aspects of the present invention.
Figure 3A:
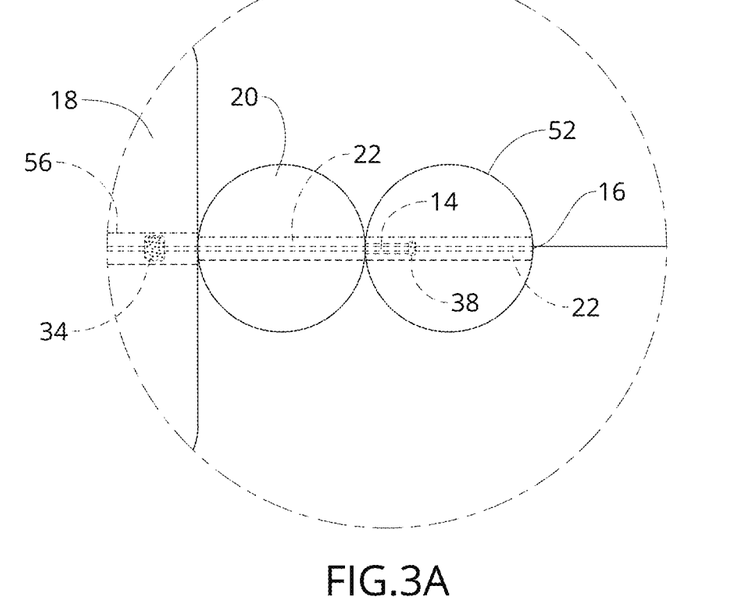
FIG. 3A is a first sectional view, taken along line 3-3 of FIG. 2, of a portion of a first embodiment of a Fishing Rig, according to aspects of the present invention.
Figure 3B:
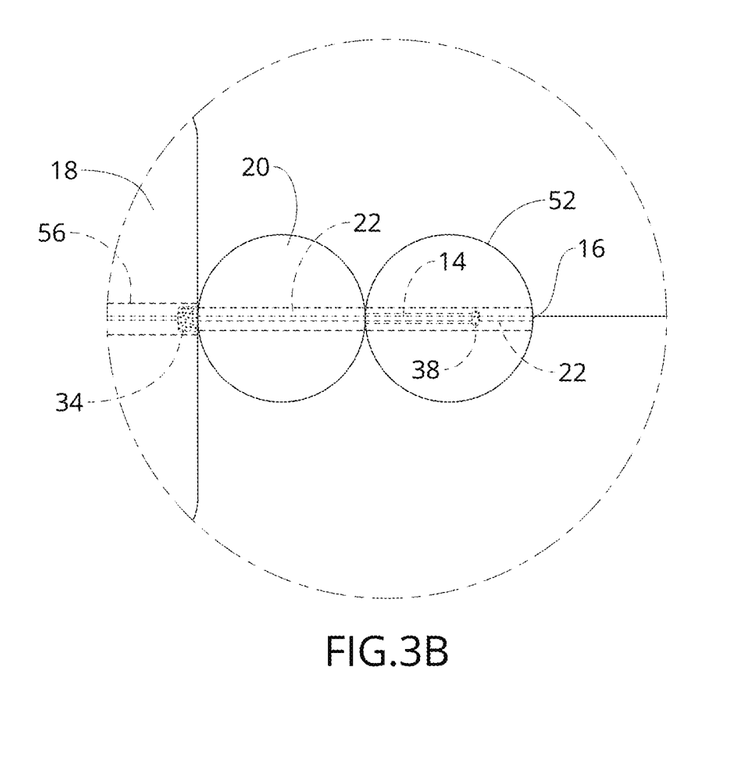
FIG. 3B is a second sectional view, taken along line 3-3 of FIG. 2, of a portion of a first embodiment of a Fishing Rig, according to aspects of the present invention.

A first end of the side leader assembly is formed of plurality of components which are attached to the first end of side leader 14 and a second plurality of components to the second end before attachment of hook 54. In embodiments, side leader 14 has diameter of 0.017 inches, but is not so limited. To construct the side leader assembly, the side leader assembly is affixed to the main leader 12 through a loop that protrudes from the hole on a side of inline cylinder float 18. In embodiments, a knot, or tie, such as a reverse Palomar knot 34, but not so limited, is utilized to affix the side leader assembly to the main leader 12 through the loop that protrudes from inline cylinder float 18, as illustrated in FIG. 1-3.

One or more beads are affixed to side leader 14 proximate to inline cylinder 18. In embodiments, the one or more beads include a bead 20 affixed proximate to the first end of side leader 14, and a cinch bead, such as double line cinch bead 52, is affixed to side leader 14 proximate to, or in contact with bead 20. In embodiments, bead 20 is a spacer bead having an internal diameter of 0.0625 inches and functions as a stop. In embodiments, cinch bead 52 is attached a with double-line cinch knot 38 that has been reversed.

One or more beads are affixed to the second end of side leader 14 prior to attachment of hook 28. In embodiments, the one or more beads differ in type and are affixed in a specific order. For example, a single line cinch bead 50 is affixed on side leader at a desired side leader length, a float bead 48 is affixed proximate to, or in contact with, first single-line cinch bead 50 and bead 20 is affixed on side leader 14 proximate to, or in contact with, float bead 48. The hook 28 is attached to the second end of leader 14 with a five-wrap Snell knot 54. In embodiments, cinch knot 38 is a reversed single-line cinch knot and is snugged to cinch bead 50 to prevent movement as well as a break point when a 4 mm cinch bead is used.

Advantageously, affixing the side leader assembly to the loop of the main leader with an adjustable cinch bead allows for adjustment of an operating slip tension of the rig, wherein the slip tension is adjusted with a selected amount of slack between bead 20 and cinch bead 52. That slack is accessible and is set at assembly or reset later by holding the spacer bead 20 and pulling on the cinch bead 52 to open up this slack, sliding to a selected amount of return, snugging the bead. For example, with a snug set on the cinch bead 52, a user can pull main line 12 both above and below inline cylinder float 18 to slide reverse Palomar knot 34 back into diameter 56 of inline cylinder float 18 for an amount of slack and respective slip tension, as illustrated in FIG. 3A-B. In the exemplary embodiment, the spacer bead 20 acts as a stop, with only manual adjustment within the inline cylinder float 18 possible. All embodiments have this enhancement or capability for resetting the low tension when the spacer bead 20, or grip bead, is held allowing the cinch bead 52 to travel, be adjusted, and returned to that tension.

Figures 4, 5A, 5B:
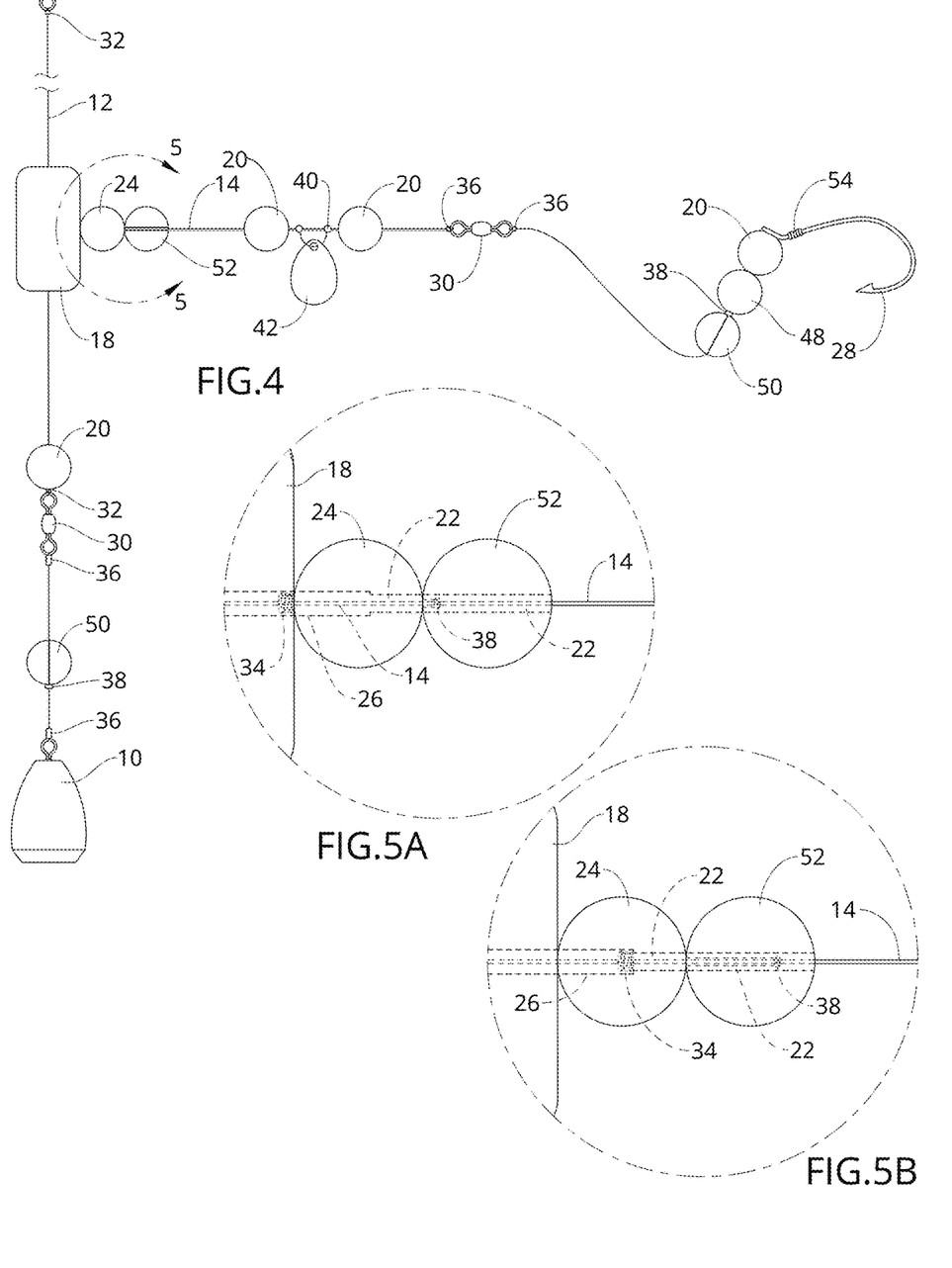
FIG. 4 is an elevation view of a schematic diagram of a second embodiment of a Fishing Rig, according to aspects of the present invention.
FIG. 5A is a first sectional view, taken along line 5-5 of FIG. 4, of a portion of a first embodiment of a Fishing Rig, according to aspects of the present invention.
FIG. 5B is a second sectional view, taken along line 5-5 of FIG. 4, of a portion of a first embodiment of a Fishing Rig, according to aspects of the present invention.

FIGS. 4-5B illustrate a second embodiment of a fishing rig, according to aspects of the present invention. Similar to the first embodiment, a two-way swivel 30 is affixed to a first end of main leader 12 using a knot, or tie, such as a Palomar knot 32. In embodiments, the main leader 12 has a diameter of 0.018 inches but is not so limited. A bead 20 is disposed on main leader 12 proximate to a second end. A float, such as inline cylinder float 18, is affixed between the first end and the second end of main leader 12, with a portion of main leader 12, forming a loop, protruding from a hole on a side of inline cylinder float 18. In embodiments, the hole has an inner diameter 56, which can be 0.078 inches, but is not so limited. A second two-way swivel 30 is affixed to the second end of main leader 12 using a knot, or tie, such as a Palomar knot 32.

A weight assembly is formed utilizing a plurality of components and is affixed to the second two-way swivel. The weight assembly includes a weight 10 affixed to first end of a line (unlabeled) using a knot, or tie, such as a three-wrap cinch knot 36. In embodiments, weight 10 can be a steel drop sinker, but is not so limited. A bead, such as a cinch bead 50, is affixed on the line between the first end and the second end. Additionally, the cinch loop or knot 38 is formed on the front of the bead 50 is reversed to the back of that loop to provide a breakaway point for the weight assembly. In embodiments, cinch bead 50 is a 4 mm diameter cinch bead.

A side leader assembly of the second embodiment includes a side leader sub-assembly and a hook sub-assembly. To construct the hook sub-assembly a hook 28 is attached to a first end of the line using a knot, or tie, such as a five-wrap cinch Snell knot 54. One or more beads are affixed to the line, proximate to hook 28. In embodiments, the one or more beads differ in type and are affixed in a specific order. For example, a first bead 20 is affixed on side leader 14 proximate to, or in contact with, hook 28, a float bead 48 is affixed on side leader 14 proximate to, or in contact with, first bead 20, and a single-line cinch bead 50 is affixed on side leader 14 proximate to, or in contact with, float bead 48. In embodiments, a knot, such as cinch knot 38 formed on the front of bead 50 during the cinch is reversed to the back and snugged to both prevent movement of beads, to block some of the available gap in a walleye (EWG) or octopus hook 54 to enhance snag resistance, and to provide a break point. In embodiments, cinch bead 50 is a 4 mm diameter cinch bead.

To construct a side-leader subassembly, a first end the side leader subassembly is affixed to the main leader 12 through the loop, protruding from a hole on a side of inline cylinder float 18. In embodiments, the side leader assembly is affixed to the loop using a knot, or tie, such as reverse Palomar knot 34, but is not so limited, as illustrated in FIG. 5A-B. In embodiments, side leader sub-assembly is a double side leader.

A first end of the side-leader sub-assembly is formed of a plurality of components which are attached to the first end of side leader 14. One or more beads are affixed to side leader 14 proximate to first end of side leader 14. In embodiments, the one or more beads include a spacer bead 24 affixed proximate to the first end of side leader 14 and a cinch bead, such as double line cinch bead 52, is affixed to side leader 14 proximate to, or in contact with spacer bead 24. In embodiments, the cinch bead is secured to leader 14 with a double line cinch knot 38. In embodiments, spacer bead 24 is a spacer bead having a plurality of internal diameters, as illustrated in FIG. 5A-B. In embodiments, the plurality of internal diameters of spacer bead 24 include a first diameter configured for tension, or lock, such as a 0.078 inch diameter, and a second diameter configured for stop, such as a 0.0625 inch diameter, but are not so limited. In embodiments, when spacer bead 24 has both a diameter for tension and another for increased tension or lock with this stop, the rig then has dual tensions or a low tension and a reversible lock. The low tension or lock release results from pulling on both the main leader 12 above and below the inline cylinder float 18 thereby sliding the Palomar knot 34 back in the spacer bead 24 or further back into the inline cylinder float 18. The higher tension set results from holding the cinch bead 52 and pulling the beads at the swivel sliding the Palomar knot 34 to the spacer bead 24 internal stop. These two tensions are illustrated in the expanded views of FIGS. 5A and 5B. In embodiments, when holding cinch bead 52 the travel is that of the cinch bead knot 38 rather than that of the cinch bead.

A second end of the side leader sub-assembly is formed of a plurality of components which are attached to a second end of side leader 14. One or more beads are affixed to side leader 14 proximate to a second end of side leader 14. The plurality of components are disposed on side leader 14 between cinch bead 52 and the two-way swivel 30. In this embodiment, a spinner blade 42 is affixed to side leader 14 using a clevis 40. Additionally, bead(s) 20 are disposed on either side of spinner blade 42 on side leader 14. In embodiments, before affixing the two-way swivel 30 with the side leader 14, being a double side leader, with a three-wrap cinch knot. The second end of the hook subassembly is also attached to this two-way swivel 30 with a three-wrap cinch 36 of a single line, to complete the side leader sub-assembly.

Figure 6:
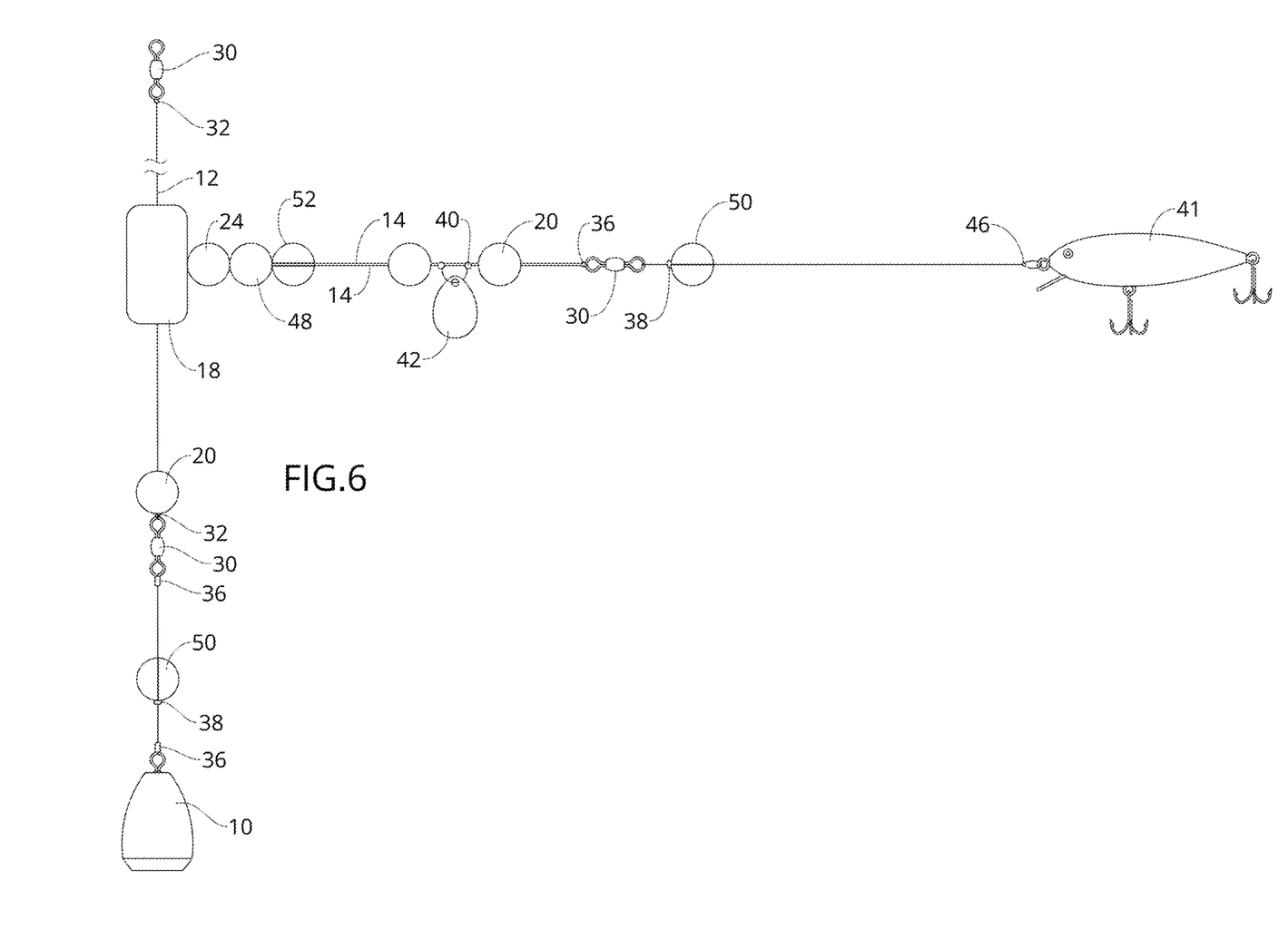
FIG. 6 is an elevation view of a schematic diagram of a third embodiment of a Fishing Rig, according to aspects of the present invention.
Figures 7A, 7B, 7C, 7D:
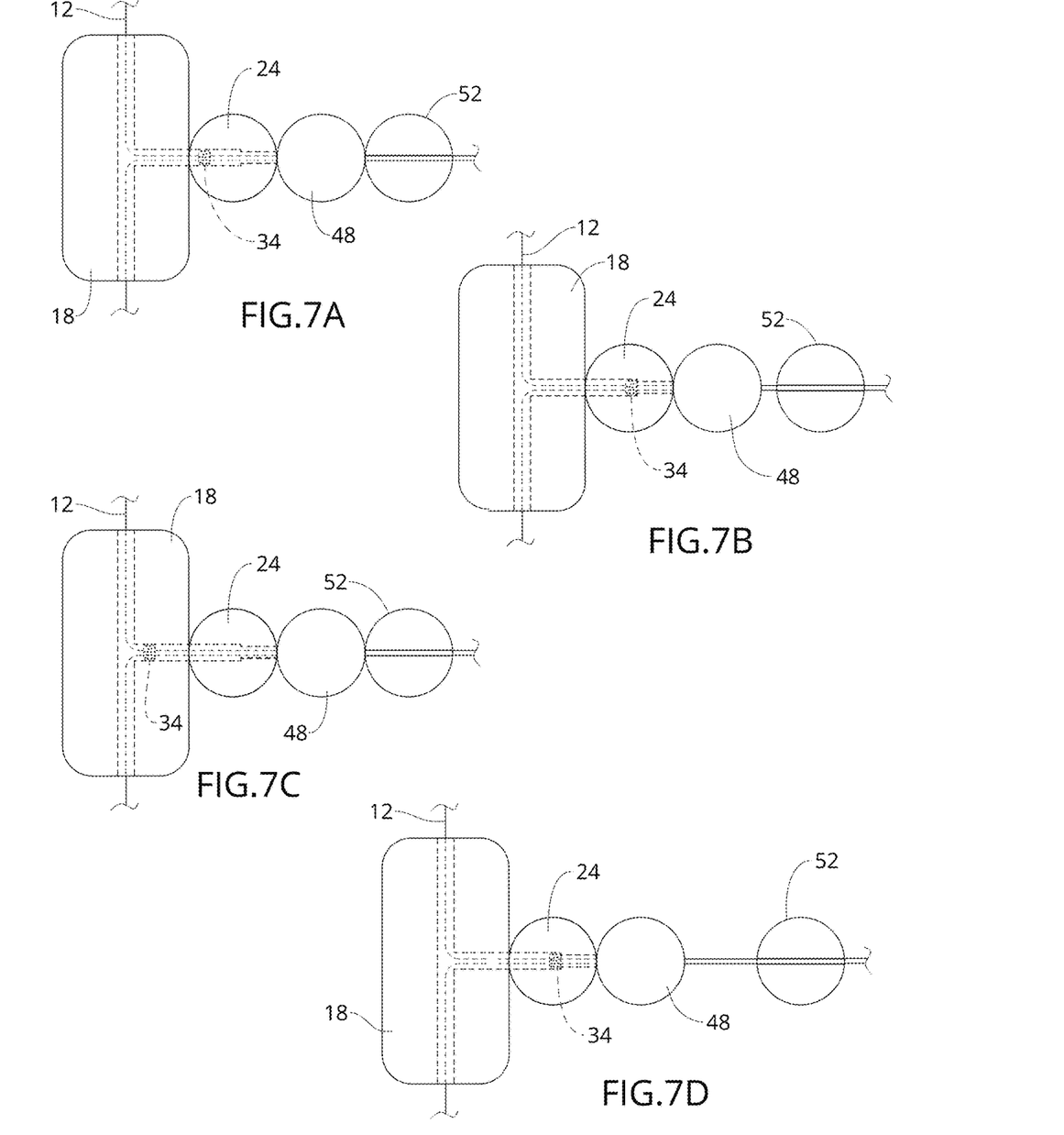
FIG. 7A is a first detailed view of components of a Fishing Rig, according to aspects of the present invention.
FIG. 7B is a second detailed view of components of a Fishing Rig, according to aspects of the present invention.
FIG. 7C is a third detailed view of components of a Fishing Rig, according to aspects of the present invention.
FIG. 7D is a fourth detailed view of components of a Fishing Rig, according to aspects of the present invention.

FIGS. 6-7D illustrate a third embodiment of a fishing rig, according to aspects of the present invention. The third embodiment, differs from the second embodiment in the construction of side leader assembly which includes a side leader sub-assembly with an additional float bead 48 and a lure sub-assembly.

To construct the lure sub-assembly a lure 41 is attached to a first end of the line using a knot, or tie, such as a Rapala knot 46. A bead, such as a single-line cinch bead 50 is affixed to the line proximate to the second end of the line. In embodiments, cinch knot 38 is a reversed cinch knot and is snugged to cinch bead 50, with a diameter of 4 mm to provide a break point to allow rig retention with only the loss of the lure in breakaway.

The side leader subassembly is affixed to the main leader 12 through the loop, protruding from the hole on a side of inline cylinder float 18, using a knot, or tie, such as reverse Palomar knot 34, but is not so limited. In embodiments of the side leader subassembly, side leader 14 is a double line leader, but is not so limited. One of the leaders formed when joining the loop protruding from float 18 with that of the side leader can be terminated with a tail 16 as depicted in FIG. 1-3B. A plurality of components can be also attached or affixed to these two leaders.

The side leader sub-assembly is formed of a plurality of components which are attached proximate to the first end of side leader 14. One or more beads are affixed to side leader 14 proximate to first end of side leader 14. In embodiments, the one or more beads include a spacer bead 24 affixed proximate to the first end of side leader 14, a float bead 48, affixed proximate to, and in contact with the spacer bead, and a cinch bead, such as double line cinch bead 52, is affixed to side leader 14 proximate to, or in contact with a float bead. In embodiments, double line cinch bead 52 is secured to the double line with a double line cinch knot 38 that has been reversed. In embodiments, spacer bead 24 is a spacer bead having a plurality of internal diameters, as illustrated in FIG. 7A-D.

In embodiments, the plurality of internal diameters of spacer bead 24 include a first diameter configured for tension, or lock, such as a 0.078 inch and a second configured for stop such as 0.0625 inch, but are not so limited. In embodiments, when spacer bead 24 has both a diameter for tension and another for increased tension or lock with this stop, the rig then has dual tensions or a low tension and a reversible lock. The low tension or lock release results from pulling on both the main leader 12 above and below the inline cylinder float 18 thereby sliding the Palomar knot 34 back in the spacer bead 24 or further back into the inline cylinder float 18. The higher tension set results from holding the cinch bead 52 and pulling the beads at the swivel sliding the Palomar knot 34 to the spacer bead 24 internal stop. These two tensions are illustrated in the expanded views of FIGS. 7A-D.

A plurality of components are disposed on side leader 14 between the double line cinch bead 52 and the two-way swivel. In this embodiment, a spinner blade 42 is affixed to side leader 14 using a clevis 40. Additionally, bead(s) 20 are disposed on either side of spinner blade 42 on side leader 14 before affixing the two-way swivel with to both of the side leaders with a three-wrap cinch knot. The hook subassembly is attached to this two-way swivel with a three-wrap cinch 36 of the single line, for completion of the rig.

In embodiments, the side leader assembly is affixed to the loop using a knot, or tie, such as reverse Palomar knot 34, but is not so limited, as illustrated in FIG. 7A-D. In embodiments, float bead 48 functions as a grip bead to hold when pulling the beads at two-way swivel 32 to set the higher or lock tension. One can then visually see the amount of slack or the distance the Palomar knot 34 will return when a snug set on cinch bead 52 is utilized. In comparing FIGS. 7A and 7B with FIGS. 7C and 7D, this relationship is illustrated for a rig with spacer bead 24 that has two internal diameters. A similar relationship also exists if the spacer bead 24 has one diameter, either less or more than that of the Palomar knot 34. Float bead 48 typically have a small internal diameter and can also function as a stop allowing the use of a spacer bead 24 with one internal diameter greater than that of the Palomar knot 34.

It should be understood, of course, that the foregoing relates to exemplary embodiments of the invention and that modifications may be made without departing from the spirit and scope of the invention as set forth in the following claims.

What is claimed is:

1. A fishing rig, comprising:
a main leader assembly, comprising: a main leader;
an inline float, affixed to the main leader, having a longitudinal bore and a radial bore normal to the longitudinal bore, wherein the main leader is disposed through both the longitudinal bore and the radial bore forming a loop in the radial bore;
a weight affixed to the main leader; and
a cinch bead affixed to the main leader between the inline float and the weight;
a side leader assembly, comprising:
a side leader with the first end of the side leader affixed to the loop of the main leader utilizing a reverse Palomar knot;
a spacer bead affixed to the side leader proximate to the inline cylinder float;
a cinch bead affixed to the side leader proximate to the spacer bead;
a cinch bead affixed to the side leader at a desired side leader length;
a float bead affixed proximate to the single-line cinch bead; a bead affixed proximate to the float bead; and
a hook affixed to the second end of the side leader with a five-wrap Snell knot.

2. The fishing rig of claim 1, wherein the inline float is an inline cylinder float.

3. The fishing rig of claim 1, wherein the cinch beads are attached to the main leader or side leader with one or more cinch knots.

4. The fishing rig of claim 3, wherein the one or more cinch knots are one of: a single line cinch knot, or a double line cinch knot.

5. The fishing rig of claim 1, wherein the spacer bead has a single internal diameter less than that of the reverse Palomar knot.

6. The fishing rig of claim 1, wherein the reverse Palomar knot used to attach the side leader to the main leader is a Palomar knot in which the loop that is formed after going thru the loop is passed thru by the second end of the side leaders.

7. A fishing rig, comprising:
a main leader assembly, comprising:
a main leader;
an inline float, affixed to the main leader, having a longitudinal bore and a radial bore normal to the longitudinal bore, wherein the main leader is disposed through both the longitudinal bore and the radial bore forming a loop in the radial bore;
a weight affixed to the main leader; and
a bead affixed to the main leader to a first end of the main leader;
a weight assembly, comprising:
a leader;
a weight affixed to the leader;
a first cinch bead affixed to the leader; and
a first two-way swivel affixed to a second end of the leader;
a hook assembly, comprising:
a hook leader;
a hook affixed to a first end of the hook leader;
a first bead affixed to the hook leader proximate to the hook;
a float bead affixed to the hook leader proximate to the first bead;
a second cinch bead affixed to the hook leader proximate to the float bead; and
a second two-way swivel affixed to a second end of the hook leader;
a side leader assembly, comprising:
a side leader, wherein a first end of the side leader is affixed to the loop of the main leader utilizing a reverse Palomar knot;
a spacer bead having a plurality of inner diameters affixed to a first end of the side leader;
a double line cinch bead affixed to the side leader proximate to the spacer bead;
a spinner blade affixed to the side leader using a clevis;
a third bead affixed to the side leader proximate to a first end of the clevis; and
a fourth bead affixed to the side leader proximate to a second end of the clevis;
wherein the first end of the main leader is affixed to the first two-way swivel, and a second end of the side leader is affixed to the second two-way swivel.

8. The fishing rig of claim 7, wherein the inline float is a cylinder float.

9. The fishing rig of claim 7, wherein the cinch beads and attached to the main leader or side leader with one or more cinch knots.

10. The fishing rig of claim 7, wherein the reverse Palomar knot used to attach the side leader to the main leader is a Palomar knot in which the loop that is formed after going through the loop is passed through by the second end of the side leaders.

11. A fishing rig, comprising:
   a main leader assembly, comprising:
      a main leader;
      an inline float, affixed to the main leader, having a longitudinal bore and a radial bore normal to the longitudinal bore, wherein the main leader is disposed through both the longitudinal bore and the radial bore forming a loop in the radial bore; and
      a bead affixed to the main leader to a first end of the main leader;
   a weight assembly, comprising:
      a leader;
      a weight affixed to the leader;
      a cinch bead affixed to the leader; and
      a first two-way swivel affixed to a second end of the leader;
   a lure assembly, comprising:
      a leader;
      a lure affixed to a first end of the leader;
      a second two-way swivel affixed to a second end of the lure leader; and
      a cinch bead affixed to the lure leader proximate to the second two-way swivel;
   a side leader assembly, comprising:
      a side leader, wherein the first end of the side leader is attached to the main leader utilizing a reverse Palomar knot;
      a spacer bead, having a plurality of inner diameters affixed to a first end of the side leader;
      a float bead affixed to the side leader; a cinch bead affixed to the side leader;
      a spinner blade affixed to the side leader using a clevis;
      a bead affixed to the side leader proximate to a first end of the clevis; and
      a bead affixed to the side leader proximate to a second end of the clevis;
      wherein the first end of the main leader is affixed to the first two-way swivel, and a second end of the side leader is affixed to the second two-way swivel.

12. The fishing rig of claim 11, wherein the inline float is an inline cylinder float.

13. The fishing rig of claim 11, wherein the reverse Palomar knot used to attach the side leader to the main leader is a Palomar knot in which the loop that is formed after going thru the loop is passed thru by the second end of the side leaders.

* * * * *